(12) United States Patent  
Hendey, III

(10) Patent No.: US 8,695,536 B2
(45) Date of Patent: Apr. 15, 2014

(54) CHILDREN'S TOY FOR COLLECTING FISH AT A SHORE LINE

(76) Inventor: Richard S. Hendey, III, Mamaroneck, NY (US)

( * ) Notice: Subject to any disclaimer, the term of this patent is extended or adjusted under 35 U.S.C. 154(b) by 300 days.

(21) Appl. No.: 13/212,008

(22) Filed: Aug. 17, 2011

(65) Prior Publication Data

US 2013/0043251 A1   Feb. 21, 2013

(51) Int. Cl.
*A01K 63/00* (2006.01)

(52) U.S. Cl.
USPC .......................................... 119/247; D30/107

(58) Field of Classification Search
USPC ............. 119/245–247, 253, 265; 43/54.1, 55, 43/56; 47/69; D30/106, 107; 210/464, 210/469; 220/754
See application file for complete search history.

(56) References Cited

U.S. PATENT DOCUMENTS

| 1,055,541 | A | * | 3/1913 | Keltner | 210/469 |
| 2,055,912 | A | * | 9/1936 | Schonger | 43/56 |
| 2,734,305 | A | * | 2/1956 | Hannah | 43/56 |
| 4,606,143 | A | * | 8/1986 | Murphy, Jr. | 43/56 |
| 5,330,378 | A | * | 7/1994 | Park | 441/133 |
| D435,701 | S | | 12/2000 | Willinger | |
| 6,354,246 | B1 | * | 3/2002 | Kamihata et al. | 119/496 |
| 7,946,250 | B2 | * | 5/2011 | Holms et al. | 119/265 |

* cited by examiner

*Primary Examiner* — Kristen C Hayes
(74) *Attorney, Agent, or Firm* — Gallagher Intellectual Property Law; Thomas A Gallagher

(57) ABSTRACT

A child's toy for collecting fish includes a clear bowl with a rope handle attached to it. Tethered to the rope handle is a lid with a water and air permeable mesh. The handle preferably includes a buoyant member such as a wooden cylinder hand grip which will keep the apparatus from sinking if let go. The apparatus is preferably made from a plastic fish bowl into which two diametrically opposed holes are created to receive ends of the rope handle which is held in place by tying. The fish bowl has an upper lip and a ring dimensioned to fit over the lip. A circular mesh screen is attached to the ring and the ring is attached by a tether to the bowl or to the rope handle. A kit and a method of assembly are also disclosed.

18 Claims, 5 Drawing Sheets

CHILDREN'S TOY FOR COLLECTING FISH AT A SHORE LINE

BACKGROUND OF THE INVENTION

1. Field of the Invention

This invention relates broadly to toys More particularly, this invention relates to a versatile container for collecting fish at a shore line/tidal pool.

2. State of the Art

For many years, children living near a shore line or a tidal pool would collect fish to study their appearance and movements. One common way of doing this was with a net, a bucket, and a digging tool. Digging in the sand near shore or in a tidal pool stirred up crabs, minnows, star fish, snails, and the like. These were captured in the net and released into the bucket for study. After a while, the fish were returned to the wild.

SUMMARY OF THE INVENTION

It is an object of the invention to provide an apparatus to improve the fun and educational value of collecting fish at a shore line/tidal pool.

Thus, the present invention includes a clear bowl with a rope handle attached to it. Tethered to the rope handle is a lid with a water and air permeable mesh. The handle preferably includes a buoyant member such as a wooden cylinder hand grip which will keep the apparatus from sinking if let go.

The apparatus is preferably made from a plastic fish bowl into which two diametrically opposed holes are created to receive ends of the rope handle which is held in place by tying. The fish bowl has an upper lip and a ring dimensioned to fit over the lip. A circular mesh screen is attached to the ring and the ring is attached by a tether to the bowl or to the rope handle.

A kit for assembling the apparatus includes the bowl with diametrical holes pre-formed, the ring, the mesh, the rope, the wooden hand grip, and the tether. The kit may also include glue and assembly instructions.

The method for assembling the kit are included in the assembly instructions

Additional objects and advantages of the invention will become apparent to those skilled in the art upon reference to the detailed description taken in conjunction with the provided figures.

DETAILED DESCRIPTION

Figure 1:
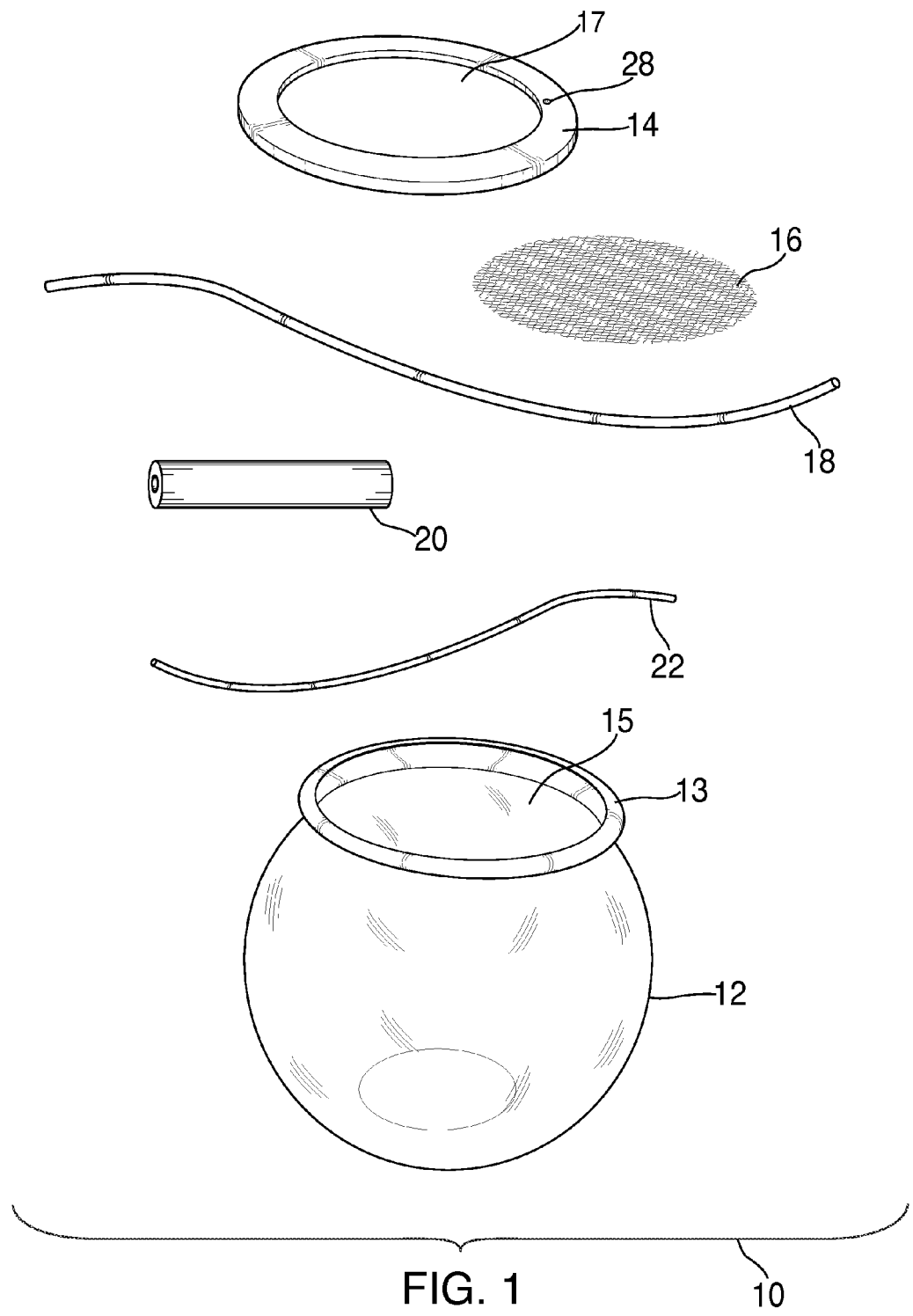
FIG. 1 is an exploded view of the components of the invention.

Turning now to FIG. 1, the components of an apparatus 10 according to the invention are shown in a disassembled state. The components are, generally, a clear plastic bowl 12, having an upper lip 13, defining an opening 15, a circular ring 14, defining a central opening 17, a circular piece of mesh 16, a length of rope 18, a buoyant hand grip 20, and a tether 22. The bowl 12 and ring 14 (prior to modification according to the invention) are disclosed in U.S. Pat. No. 435,701, the complete disclosure of which is incorporated by reference herein. These items can presently be purchased from Imagine Gold, LLC, South Hackensack, N.J. However, they are relatively easy to manufacture.

Figure 2:
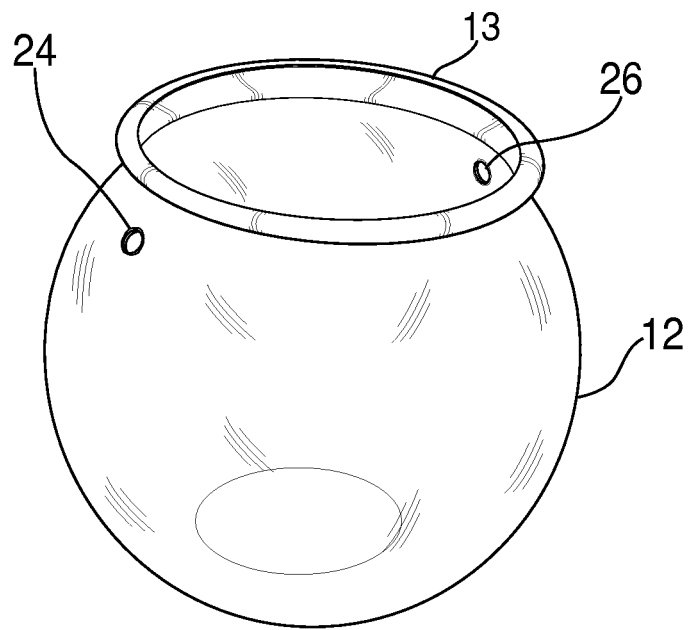
FIG. 2 is a perspective view of a modified bowl showing two diametrically opposed holes.
Figure 3:
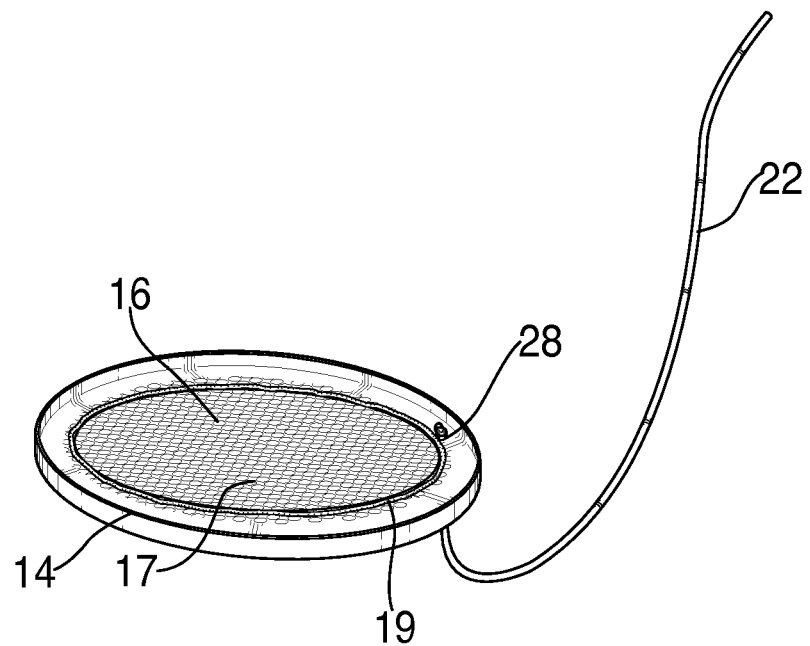
FIG. 3 is perspective view of the rim with mesh and tether attached.

FIGS. 2 and 3 show how the fish bowl 12 and ring 14 are modified according to the invention. As seen in FIG. 2, the bowl 12 is modified by providing two diametrical holes 24, 26 near the upper lip 13. The holes are preferably formed by a heat source rather than a drill since a drill is likely to cause the plastic bowl to crack. As seen in FIG. 3, the ring 14 (shown upside down) is fitted with the mesh 16 which is attached by a bead of glue 19 so that the mesh 16 covers the central opening 17. In addition, a peripheral hole 28 is drilled in the ring 14 so that the tether 22 may be attached. The simplest attachment is to pass one end of the tether through the hole 28 and tie its end. Alternatively, the end could be crimped or otherwise deformed to exceed the diameter of the hole 28.

Figure 4:
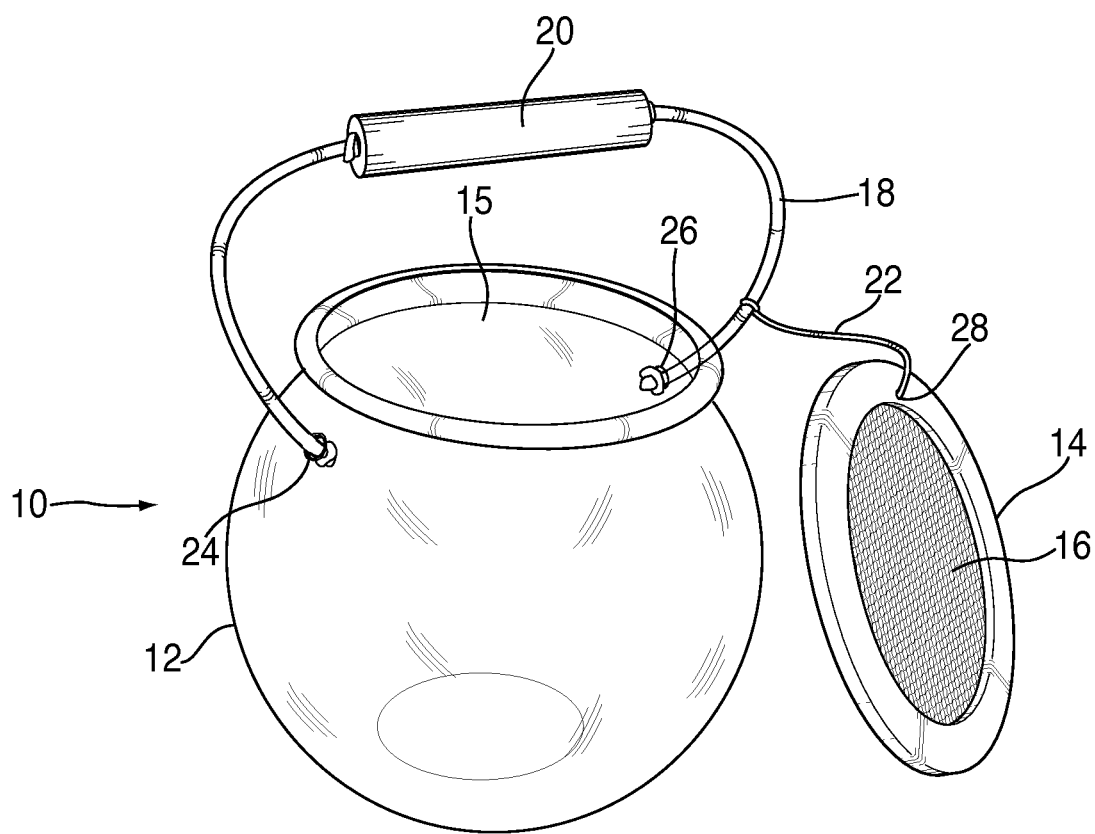
FIG. 4 is a perspective view of the toy assembled with the rim-mesh cover removed from the bowl but secured by the tether.

FIG. 4 shows the apparatus 10 completely assembled with the opening 15 of the bowl 12 uncovered. The ends of the rope 18 are inserted respectively through the holes 24, 26 in the bowl 12 and tied, crimped, or otherwise deformed to exceed the diameter of the holes. Prior to attaching the rope 18 to the bowl 12, the buoyant hand grip 20 is attached to the rope 18. According to the presently preferred embodiment, the handgrip is a wooden cylinder and the rope 18 is passed through it as illustrated in FIG. 4. The ring 14 with mesh 16 is tethered to the apparatus by tying the tether 22 to the rope 18. It will be appreciated, however, that the tether 22 could be directly attached to the bowl 12 through another hole (not shown).

Figure 5:
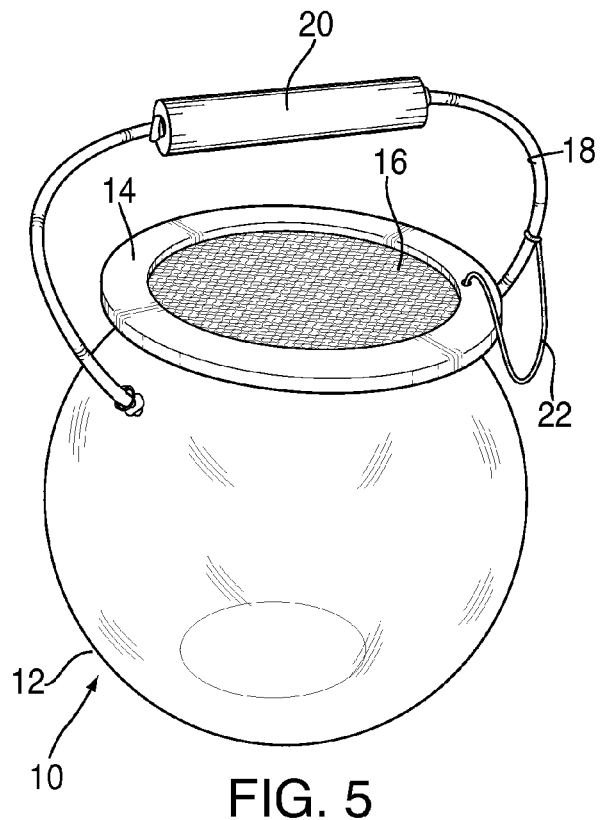
FIG. 5 is a view similar to FIG. 4 but with the rim-mesh cover covering the opening to the bowl.
Figure 6:
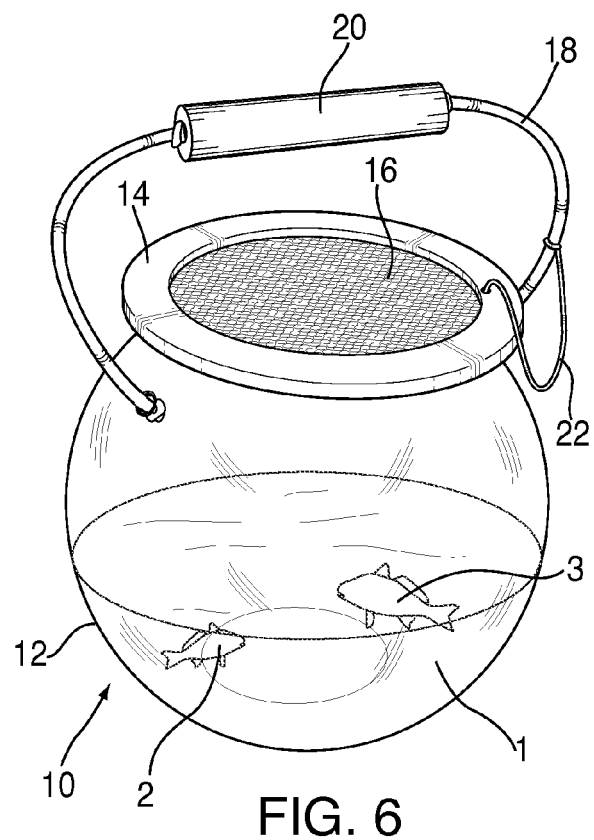
FIG. 6 is a view similar to FIG. 5 but showing the bowl containing fish and water.

FIG. 5 illustrates the apparatus 10 with the ring 14 with mesh 16 covering the opening of the bowl 12. FIG. 6 is a view similar to FIG. 5 but showing the bowl 12 containing some water 1 and fish 2 and 3.

The apparatus of the invention is safe particularly because the bowl 12 is made of plastic. It is also secure because the cover (ring 14 with mesh 16) is tethered to the apparatus to prevent loss and the hand grip 20 is buoyant to prevent the apparatus from sinking. The hand grip 20 can be pigmented with a bright color so that it can be easily spotted it the apparatus is let go by the child. Because the bowl is clear, the movement of the captured fish can be studied in detail. The mesh 16 allows the water 1 to be refreshed without losing any of the fish, e.g. 2, 3. Preferably, the ring 14 snugly engages the lip 13 so that it does no fall off during normal use.

Figure 7:
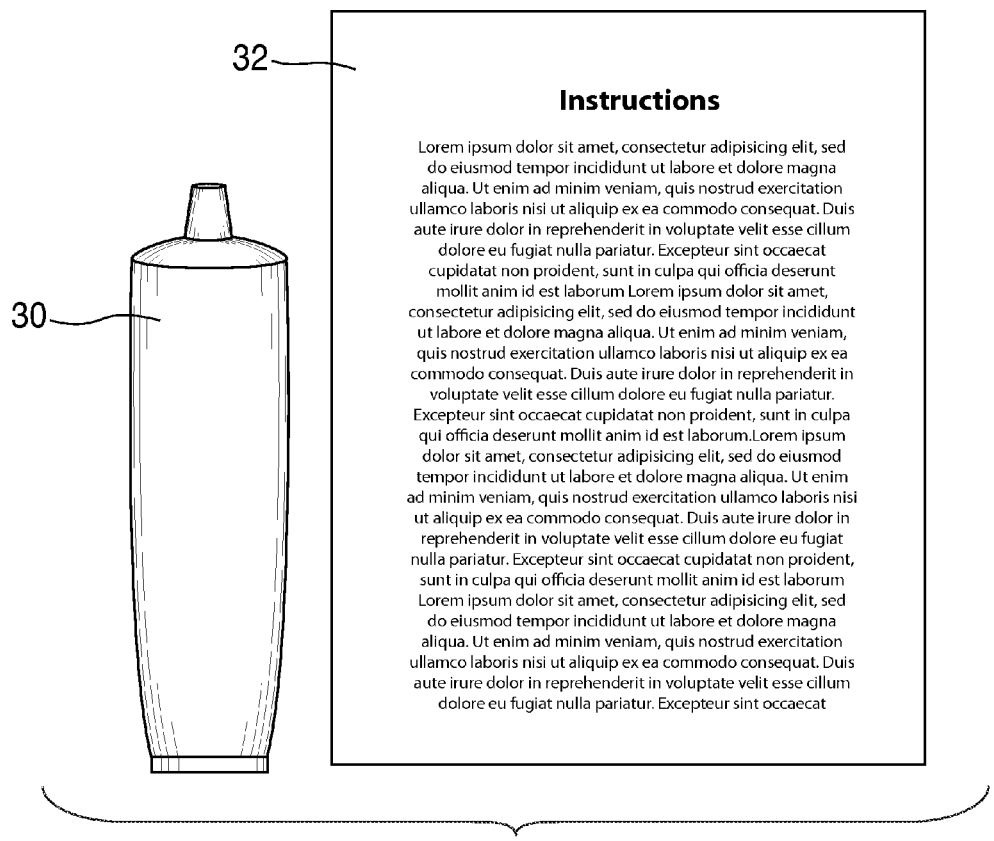
FIG. 7 shows additional components of a kit for assembling the invention.

The apparatus of the invention may be provided fully assembled or it may be sold as a kit, thus providing an additional activity for the child to assemble the apparatus. All of the components shown in FIG. 1 may be provided in a kit for assembly. Preferably, however, the holes 24, 26 (FIG. 2) are pre-formed in the bowl 12 and the hole 28 is preformed in the ring 14 that are included in the kit. The kit advantageously also includes the items shown in FIG. 7, namely a tube of glue 30 and assembly instructions 32.

There have been described and illustrated herein a child's toy for collecting fish, a kit for assembling the toy, and a method of assembling the kit. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A toy, suitable for collecting and studying fish, said toy comprising:
   a clear bowl having an upper open end defining a lip;
   said clear bowl further defining first and second diametrically opposed holes below said lip;
   a flexible cord having first and second ends, said first end extending through said first hole and said second end extending through said second hole;
   a rim defining a central opening, said rim adapted to fit over said lip;
   a mesh covering said central opening of said rim; and
   a tether having a first end and a second end, said first end coupled to said rim and said second end coupled to said bowl.

2. The toy according to claim 1, wherein:
   said clear bowl is plastic.

3. The toy according to claim 1, wherein:
   said second end of said tether is tied to said flexible cord.

4. The toy according to claim 1, further comprising:
   a buoyant cylinder, said flexible cord extending through said buoyant cylinder.

5. The toy according to claim 4, wherein:
   said first and second ends of said flexible cord are knotted.

6. The toy according to claim 5, wherein:
   said rim defines a peripheral hole and said first end of said tether extends through said peripheral hole.

7. The toy according to claim 6, wherein:
   said mesh is attached to said rim by glue.

8. A toy, suitable for collecting and studying fish, said toy comprising:
   a clear bowl having an upper open end defining a lip;
   said clear bowl further defining first and second diametrically opposed holes below said lip;
   a flexible cord having first and second ends, said first end extending through said first hole and said second end extending through said second hole;
   a rim defining a central opening, said rim adapted to fit over said lip; and
   a tether having a first end and a second end, said first end coupled to said rim and said second end coupled to said bowl.

9. The toy according to claim 8, wherein:
   said clear bowl is plastic.

10. The toy according to claim 8, wherein:
    said second end of said tether is tied to said flexible cord.

11. The toy according to claim 8, further comprising:
    a buoyant cylinder, said flexible cord extending through said buoyant cylinder.

12. The toy according to claim 8, wherein:
    said first and second ends of said flexible cord are knotted.

13. The toy according to claim 8, wherein:
    said rim defines a peripheral hole and said first end of said tether extends through said peripheral hole.

14. A toy, suitable for collecting and studying fish, said toy comprising:
    a clear bowl having an upper open end defining a lip;
    said clear bowl further defining first and second diametrically opposed holes below said lip;
    a flexible cord having first and second ends, said first end extending through said first hole and said second end extending through said second hole;
    a rim defining a central opening, said rim adapted to fit over said lip;
    a buoyant cylinder, said flexible cord extending through said buoyant cylinder; and
    a tether having a first end and a second end, said first end coupled to said rim and said second end coupled to said bowl.

15. The toy according to claim 14, wherein:
    said clear bowl is plastic.

16. The toy according to claim 14, wherein:
    said clear bowl is substantially cylindrical.

17. The toy according to claim 14, wherein:
    said first and second ends of said flexible cord are knotted.

18. The toy according to claim 14, wherein:
    said rim defines a peripheral hole and said first end of said tether extends through said peripheral hole.

* * * * *